(12) United States Patent
Brabec et al.

(10) Patent No.: US 8,190,758 B2
(45) Date of Patent: May 29, 2012

(54) ALL HAZARDS INFORMATION DISTRIBUTION METHOD AND SYSTEM, AND METHOD OF MAINTAINING PRIVACY OF DISTRIBUTED ALL-HAZARDS INFORMATION

(75) Inventors: Frantisek Brabec, North Potomac, MD (US); David Robert Munroe Drescher, Arlington, VA (US); Edward E. Ingraham, II, Oakton, VA (US); Daniel D. Park, Arlington, VA (US)

(73) Assignee: Cooper Technologies Company, Houston, TX (US)

( * ) Notice: Subject to any disclaimer, the term of this patent is extended or adjusted under 35 U.S.C. 154(b) by 31 days.

(21) Appl. No.: 12/684,210

(22) Filed: Jan. 8, 2010

(65) Prior Publication Data
US 2010/0115590 A1     May 6, 2010

Related U.S. Application Data

(60) Division of application No. 11/987,742, filed on Dec. 4, 2007, now abandoned, which is a continuation-in-part of application No. 10/829,181, filed on Apr. 22, 2004, now Pat. No. 7,409,428.

(60) Provisional application No. 60/320,133, filed on Apr. 22, 2003, provisional application No. 60/514,873, filed on Oct. 29, 2003.

(51) Int. Cl.
*G06F 15/16* (2006.01)

(52) U.S. Cl. ........ 709/229; 709/223; 709/224; 709/225; 726/4

(58) Field of Classification Search .......... 709/223–225, 709/229; 726/4
See application file for complete search history.

(56) References Cited

U.S. PATENT DOCUMENTS

| | | | |
|---|---|---|---|
| 5,493,692 | A | 2/1996 | Theimer et al. |
| 5,946,386 | A | 8/1999 | Rogers et al. |
| 6,169,476 | B1 | 1/2001 | Flanagan |
| 6,424,828 | B1 | 7/2002 | Collins et al. |
| 6,507,589 | B1 | 1/2003 | Ramasubramani et al. |
| 6,785,379 | B1 | 8/2004 | Rogers et al. |
| 6,816,878 | B1 | 11/2004 | Zimmers et al. |
| 6,829,478 | B1 | 12/2004 | Layton et al. |
| 6,842,628 | B1 * | 1/2005 | Arnold et al. .............. 455/556.2 |
| 6,907,416 | B2 | 6/2005 | Tasooji |
| 6,909,903 | B2 | 6/2005 | Wang |

(Continued)

FOREIGN PATENT DOCUMENTS
WO    WO 0173664 A2    10/2001

OTHER PUBLICATIONS

National Information Technology Center, "The Computer Emergency Notification System (CENS) Application", Sep. 23, 2003, www.ocio.usda.gov/nitc/products/cens.html (3 pages).

(Continued)

*Primary Examiner* — Brian P Whipple
(74) *Attorney, Agent, or Firm* — King & Spalding LLP

(57) ABSTRACT

An information distribution method includes: gathering all-hazards information into an information exchange from a first information source; gathering all-hazards information into the information exchange from a second information source; distributing the all-hazards information from the information exchange to a first independently-controlled alert network; distributing the all-hazards information from the information exchange to a second independently-controlled alert network.

7 Claims, 18 Drawing Sheets

U.S. PATENT DOCUMENTS

| | | |
|---|---|---|
| 6,938,076 B2 | 8/2005 | Meyer et al. |
| 6,970,909 B2 | 11/2005 | Schulzrinne |
| 7,058,710 B2 | 6/2006 | McCall et al. |
| 7,062,535 B1 | 6/2006 | Stark et al. |
| 7,117,246 B2 | 10/2006 | Christenson et al. |
| 7,133,869 B2 | 11/2006 | Bryan et al. |
| 7,233,781 B2 | 6/2007 | Hunter et al. |
| 7,254,614 B2 | 8/2007 | Mulligan et al. |
| 7,277,018 B2 | 10/2007 | Reyes et al. |
| 7,409,428 B1 | 8/2008 | Brabec et al. |
| 7,460,020 B2 | 12/2008 | Reyes et al. |
| 7,548,952 B2 | 6/2009 | Delia et al. |
| 7,584,251 B2 | 9/2009 | Brown et al. |
| 7,602,277 B1 * | 10/2009 | Daly et al. .................... 340/438 |
| 7,617,287 B2 | 11/2009 | Vella et al. |
| 8,090,944 B2 * | 1/2012 | Lee ............................... 713/168 |
| 2001/0032232 A1 | 10/2001 | Zombek et al. |
| 2001/0047391 A1 | 11/2001 | Szutu |
| 2002/0026481 A1 | 2/2002 | Mori et al. |
| 2002/0026482 A1 | 2/2002 | Morishige et al. |
| 2002/0091944 A1 | 7/2002 | Anderson et al. |
| 2002/0120698 A1 | 8/2002 | Tamargo |
| 2003/0018726 A1 | 1/2003 | Low et al. |
| 2003/0023695 A1 | 1/2003 | Kobata et al. |
| 2003/0050986 A1 | 3/2003 | Matthews et al. |
| 2003/0069002 A1 | 4/2003 | Hunter et al. |
| 2003/0076369 A1 | 4/2003 | Resner et al. |
| 2003/0110097 A1 | 6/2003 | Lei et al. |
| 2003/0135575 A1 | 7/2003 | Marejka et al. |
| 2003/0158891 A1 | 8/2003 | Lei et al. |
| 2003/0167406 A1 | 9/2003 | Beavers |
| 2003/0172077 A1 | 9/2003 | Moussavian |
| 2004/0006694 A1 | 1/2004 | Heelan et al. |
| 2004/0008125 A1 | 1/2004 | Aratow et al. |
| 2004/0054921 A1 | 3/2004 | Land, III |
| 2005/0102374 A1 | 5/2005 | Moragne et al. |
| 2005/0159973 A1 | 7/2005 | Krause et al. |
| 2005/0162267 A1 | 7/2005 | Khandelwal |
| 2006/0020992 A1 | 1/2006 | Pugel et al. |
| 2006/0031582 A1 | 2/2006 | Pugel et al. |
| 2006/0079200 A1 * | 4/2006 | Hirouchi et al. ........... 455/404.1 |
| 2006/0132301 A1 | 6/2006 | Stilp |
| 2006/0133582 A1 | 6/2006 | McCulloch |
| 2006/0161544 A1 | 7/2006 | Lee et al. |
| 2006/0168185 A1 | 7/2006 | McCall et al. |
| 2006/0223494 A1 | 10/2006 | Chmaytelli et al. |
| 2006/0235833 A1 | 10/2006 | Smith et al. |
| 2007/0005608 A1 | 1/2007 | Adler |
| 2007/0055746 A1 | 3/2007 | Oran et al. |
| 2007/0224968 A1 * | 9/2007 | Boland et al. ................. 455/411 |
| 2007/0262857 A1 * | 11/2007 | Jackson ........................ 340/506 |
| 2008/0010674 A1 * | 1/2008 | Lee ................................... 726/7 |

OTHER PUBLICATIONS

Roaming Messenger, Inc., "Breakthrough Solution for Mobile Messaging"; www.roamingmessenger.com; 2003 (1 page).

Roaming Messenger, Inc., "overview"; www.roamingmessenger.com/Technology; 2003 (1 page).

Roaming Messenger, Inc., "architecture"; www.roamingmessenger.com/Technology/architecture.php; 2003 (2 pages).

Roaming Messenger, Inc., "core technology"; www.roaming.messenger.com/Technology/coretech.php; 2003 (1 page).

Roaming Messenger, Inc., "patent info"; www.roamingmessenger.com/Technology/patent-info.php; 2003 (1 page).

U.S. Geological Survey, Earthquakes and Other Natural Hazards, Nov. 19, 1999.

Written Opinion of International Searching Authority; for PCT/US2008/85339; issued on Feb. 4, 2009.

\* cited by examiner

ALL HAZARDS INFORMATION DISTRIBUTION METHOD AND SYSTEM, AND METHOD OF MAINTAINING PRIVACY OF DISTRIBUTED ALL-HAZARDS INFORMATION

CROSS-REFERENCE TO RELATED APPLICATIONS

The present application is a divisional of U.S. patent application Ser. No. 11/987,742, filed Dec. 4, 2007 now abandoned, which is a continuation-in-part based on U.S. patent application Ser. No. 10/829,181, filed on Apr. 22, 2004 now U.S. Pat. No. 7,409,428, which claims the benefit of U.S. Provisional Application No. 60/320,133, filed Apr. 22, 2003, and U.S. Provisional Application No. 60/514,873, filed Oct. 29, 2003, all of which are hereby incorporated by reference for all purposes as if fully set forth herein.

BACKGROUND OF THE INVENTION

1. Field of the Invention

The present invention relates to all-hazards information distribution methods and a system therefor, and methods of maintaining privacy of distributed all-hazards information.

2. Discussion of the Related Art

When events occur that affect personal or communal safety or convenience, communication of the events is important. The failure to distribute information regarding the events may have a detrimental effect. Distributing the information in a timely fashion is important as well. If information is received late, or is not provided in a useful or convenient format, it may not be helpful or may be inappropriately disregarded. Furthermore, privacy concerns from providers of the information may prevent distribution of the information or may prevent timely distribution of the information.

Accordingly, there exists a need for facilitating the distribution of time-sensitive and privacy-sensitive all-hazards information in an efficient manner.

SUMMARY OF THE INVENTION

Accordingly, the present invention is directed to an information distribution method, information distribution system, and method of maintaining privacy of distributed information that substantially obviates one or more of the problems due to limitations and disadvantages of the related art.

An advantage of the present invention is to provide a method and system for distributing all-hazards information to a plurality of independently-controlled alert networks.

Another advantage of the present invention is to provide a method and system for gathering all-hazards information in a plurality of different formats.

Yet another advantage of the present invention is to provide a method and system for distributing all-hazards information into a plurality of different formats.

Yet another advantage of the present invention is to maintain privacy of distributed all-hazards information.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an information distribution method includes: gathering all-hazards information into an information exchange from a first information source; gathering all-hazards information into the information exchange from a second information source; distributing the all-hazards information from the information exchange to a first independently-controlled alert network; distributing the all-hazards information from the information exchange to a second independently-controlled alert network.

In another aspect of the present invention, a national information distribution method includes: gathering all-hazards information into a national information exchange from a plurality of information sources; distributing the all-hazards information from the national information exchange into a first regional information exchange corresponding to a first region; distributing the all-hazards information from the national information exchange into a second regional information exchange corresponding to a second region; distributing the all-hazards information from the first regional information exchange to a plurality of independently-controlled alert networks corresponding to the first region; and distributing the all-hazards information from the second regional information exchange to a plurality of independently-controlled alert networks corresponding to the second region.

In yet another aspect of the present invention, an information distribution system includes: a first independently-controlled all-hazards alert network; a second independently-controlled all-hazards alert network; an information exchange connected to the first and second independently-controlled all-hazards alert networks.

In yet another aspect of the present invention, a national information distribution system includes: a plurality of first independently-controlled all-hazards alert networks corresponding to a first region; a plurality of second independently-controlled all-hazards alert networks corresponding to a second region; a first regional information exchange connected to the first independently-controlled all-hazards alert networks; a second regional information exchange connected to the second independently-controlled all-hazards alert networks; a national information exchange connected to the first and second regional information exchanges.

In yet another aspect of the present invention, a method of maintaining privacy of distributed information includes: receiving a determination that an information source is publishable; receiving a determination that another information source is authorized-only; receiving a determination that another information source is approved-only; offering a potential subscriber a subscription to the publishable information source; receiving a request for subscription to the publishable information source from the offered potential subscriber; accepting the request for subscription to the publishable information source; receiving authorization evidence from a potential subscriber to the authorized-only information source; offering the authorized potential subscriber a subscription to the authorized-only information source; receiving a request for subscription to the authorized-only information source from the offered potential subscriber; accepting the request for subscription to the authorized-only information source; offering a potential subscriber a subscription to the approved-only information source; receiving a request for subscription to the approved-only information source from the offered potential subscriber; transmitting to a provider of the approved-only information source the request for subscription to the approved-only information source; receiving an approval of the request from the provider; accepting the approved request for subscription to the approved-only information source; receiving all-hazards information into an information exchange from the publishable information source; receiving all-hazards information into the information exchange from the authorized-only information source; receiving all-hazards information into the information exchange from the approved-only information source; distributing the publishable all-hazards information to the accepted subscriber to the publishable information source; distributing the authorized-only all-hazards information to the accepted subscriber to the authorized-only information source; and distributing the approved-only all-hazards information to the accepted subscriber to the approved-only information source.

In yet another aspect of the present invention, a method of maintaining privacy of distributed information includes: receiving a determination that an information source is publishable; receiving a determination that another information source is non-publishable; offering a potential subscriber a subscription to the publishable information source; receiving a request for subscription to the publishable information source from the offered potential subscriber; accepting the request for subscription to the publishable information source; receiving authorization evidence from a potential subscriber to the non-publishable information source; offering the authorized potential subscriber a subscription to the non-publishable information source; receiving a request for subscription to the non-publishable information source from the offered potential subscriber; accepting the request for subscription to the non-publishable information source; receiving all-hazards information into an information exchange from the publishable information source; receiving all-hazards information into the information exchange from the non-publishable information source; distributing the publishable all-hazards information to the accepted subscriber to the publishable information source; and distributing the non-publishable all-hazards information to the accepted subscriber to the non-publishable information source.

In yet another aspect of the present invention, a method of maintaining privacy of distributed information includes: receiving a determination that an information source is publishable; receiving a determination that another information source is non-publishable; offering a potential subscriber a subscription to the publishable information source; receiving a request for subscription to the publishable information source from the offered potential subscriber; accepting the request for subscription to the publishable information source; offering a potential subscriber a subscription to the non-publishable information source; receiving a request for subscription to the non-publishable information source from the offered potential subscriber; transmitting to a provider of the non-publishable information source the request for subscription to the non-publishable information source; receiving an approval of the request from the provider; accepting the approved request for subscription to the non-publishable information source; receiving all-hazards information into an information exchange from the publishable information source; receiving all-hazards information into the information exchange from the non-publishable information source; distributing the publishable all-hazards information to the accepted subscriber to the publishable information source; and distributing the non-publishable all-hazards information to the accepted subscriber to the non-publishable information source.

In yet another aspect of the present invention, an information distribution method includes: receiving a plurality of different formats of all-hazards information from a plurality of information sources; processing the different formats of all-hazards information into normalized information; distributing all-hazards messages corresponding to the normalized all-hazards information to the plurality of entities, wherein a plurality of the all-hazards messages are distributed in different formats with substantially the same content.

In yet another aspect of the present invention, an information exchange includes: one or more information receiving handlers capable of receiving a plurality of information formats; one or more processors capable of converting different all-hazards information formats into normalized all-hazards information, wherein the one or more processors are connected to the one or more information receiving handlers; one or more information distributing handlers connected to the one or more processors capable of distributing all-hazards information in a plurality of information formats.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, an example of which is illustrated in the accompanying drawings.

Figure 1:
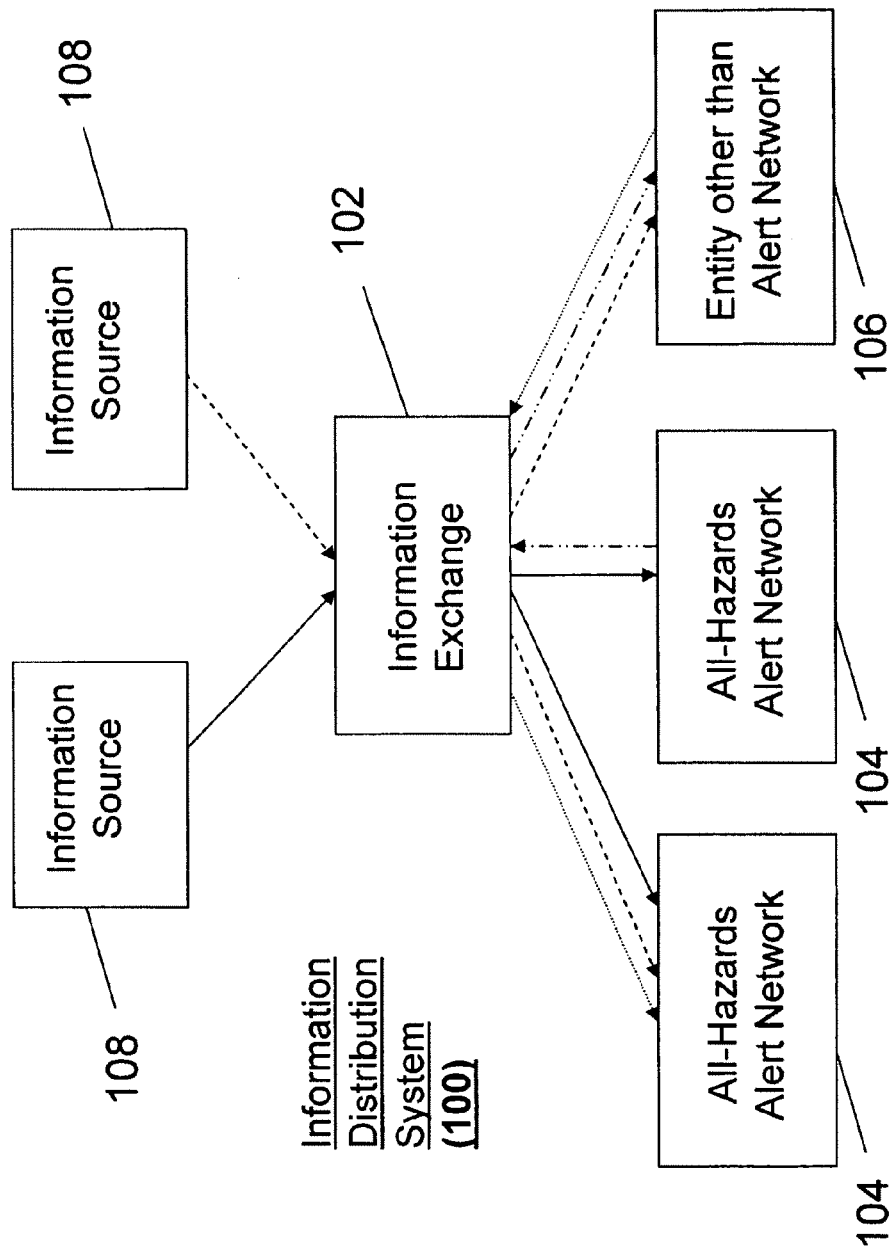
FIG. 1 illustrates an information distribution system according to an embodiment of the present invention.

FIG. 1 illustrates a computer network-based information distribution system (100), including at least one information exchange (102), a plurality of all-hazards alert networks (104) connected to the information exchange (102), one or more entities other than alert networks (106) connected to the information exchange (102) and a plurality of information sources (108) connected to the information exchange (102). The information exchange (102) receives all-hazards information from the information sources (108) and distributes the all-hazards information to the all-hazards alert networks (104) and the entities other than alert networks (106). Additionally, one or more all-hazards alert networks (104) and one or more entities other than alert networks (106) may also be information sources.

Figure 2:
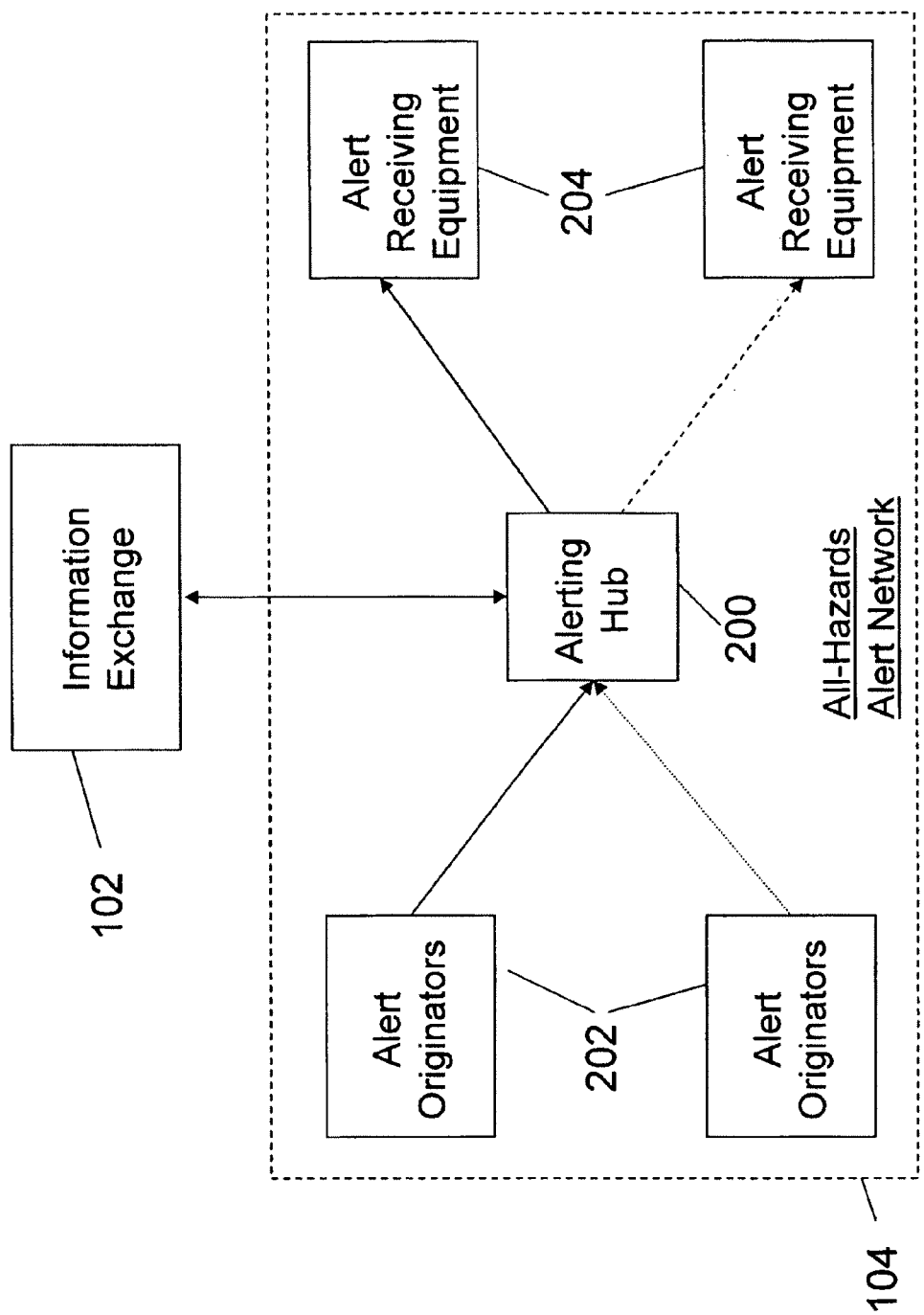
FIG. 2 illustrates an information distribution system and an all hazards alert network according to an embodiment of the present invention.

FIG. 2 illustrates an information exchange (102) connected to an all-hazards alert network (104). The all-hazards alert network (104) includes at least one alerting hub (200), one or more alert originators (202) connected to the alerting hub, and a plurality of alert receiving equipment (204) connected to the alerting hub (200). The alert originators (202) originate all-hazards alerts. The alerting hub (200) receives the originated all-hazards alerts and distributes the received all-hazards alerts to the plurality of receiving equipment (204). The alert originators (202) may originate all-hazards alerts in different formats. The alerting hub (200) normalizes the different formats by reducing the differences between the different formats, reducing the number of different formats, or by normalizing the different formats to a standard format. The plurality of alert receiving equipment (204) may have a plurality of different format requirements. The alerting hub (200) formats the all-hazards alerts into different formats corresponding to the different format requirements of the plurality of alert receiving equipment (204). The plurality of alert receiving equipment (204) may receive alerts via email, pager, text message, voice and alert applications. Two or more of the alert receiving equipment (204) may be possessed by a single user.

Additionally, the alerting hub (200) may receive responses from the alert receiving equipment (204) and distribute the responses to the originator of the alert corresponding to the response. The alerting hub (200) may normalize the alert responses and format the alert responses corresponding to format requirements of the alert originator (202).

Furthermore, the information exchange may connect to a plurality of all-hazards alert networks. The all-hazards alert networks may be independently-controlled and may include: all-hazards alert networks controlled by different local governments; all-hazards alert networks controlled by different state governments; all-hazards alert networks controlled by different federal entities; and all-hazards alert networks controlled by hospitals, airports, universities, and businesses.

Also, the information exchange may connect to a plurality of entities other than alert networks. The entities may include different local governments; all-hazards alert networks controlled by different state governments; all-hazards alert networks controlled by different federal entities; and all-hazards alert networks controlled by hospitals, airports, universities, and businesses.

Figure 3:
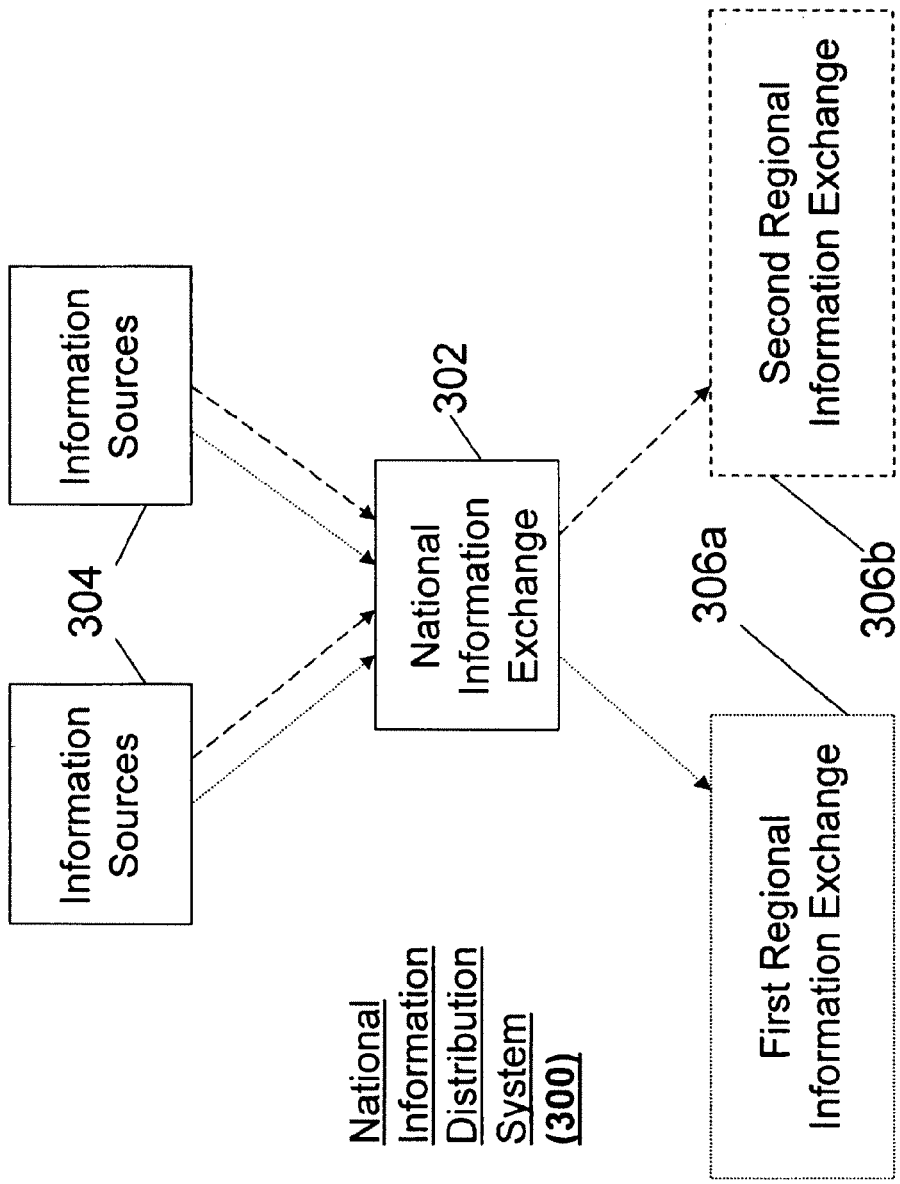
FIG. 3 illustrates a national information distribution system according to an embodiment of the present invention.

FIG. 3 illustrates a national information distribution system (300), including a national information exchange (302) connected to a plurality of information sources (304) and to a plurality of regional information exchanges (306) corresponding to a plurality of regions. The national information exchange (302) may receive all-hazards information from the information sources (304) and may distribute to the regional information exchanges (306).

Optionally, the national information exchange (302) determines one or more affected regions of the received all-hazards information and distributes the all-hazards information affecting a first region (dotted lines) into a corresponding first regional information exchange (306*a*) and distribute the all-hazards information affecting a second region (dashed lines) into a corresponding second regional information exchange (306*b*). Additionally, the national information exchange (302) may distribute all-hazards information affecting additional regions into corresponding additional regional information exchanges (306).

Figure 4:
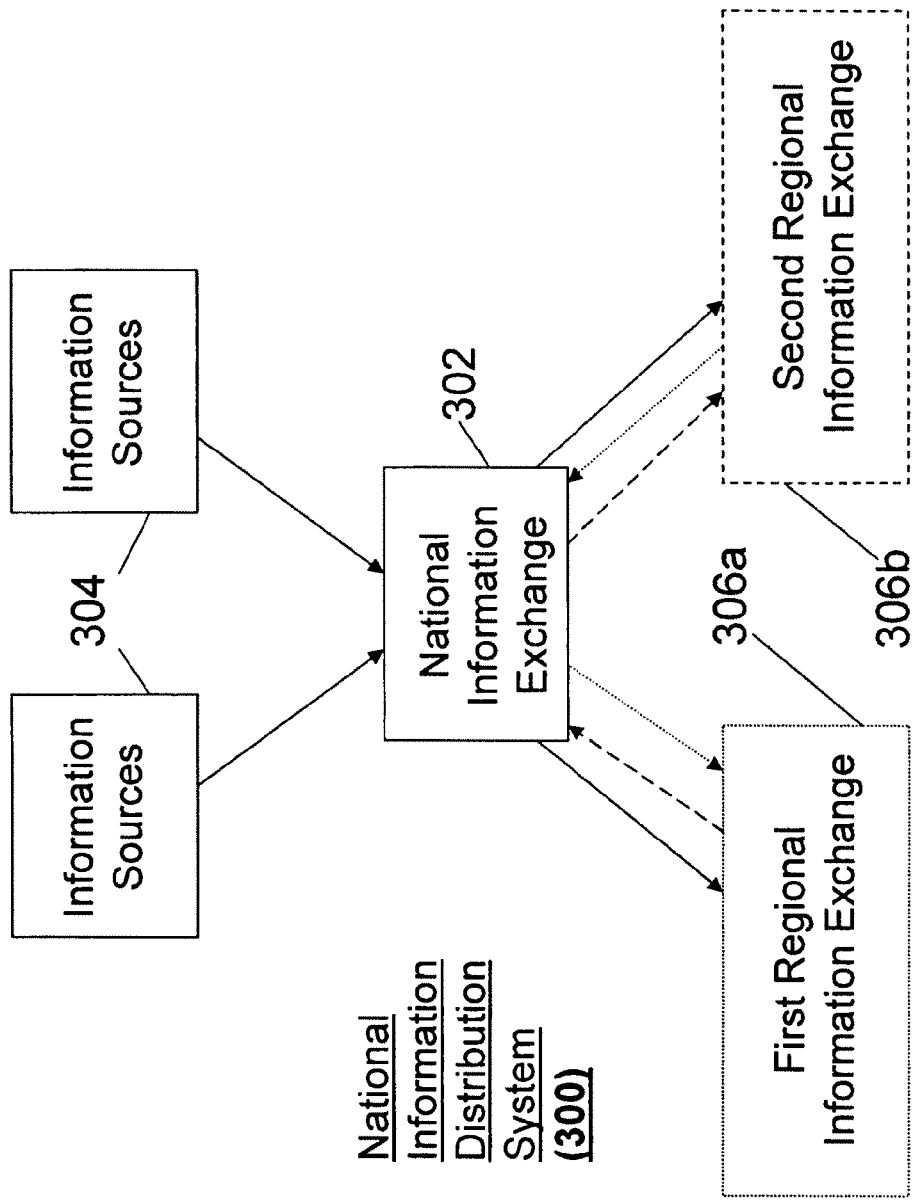
FIG. 4 illustrates a national information distribution system according to an embodiment of the present invention.

As illustrated in FIG. 4, the national information exchange (302) receives from the first regional information exchange (306*a*) all-hazards information affecting the second region (dashed lines) and distributes to the corresponding second regional information exchange (306*b*). Likewise, the national information exchange (302) receives from the second regional information exchange (306*b*) all-hazards information affecting the first region (dotted lines) and distributes to the corresponding first regional information exchange (306*a*).

Figure 5:
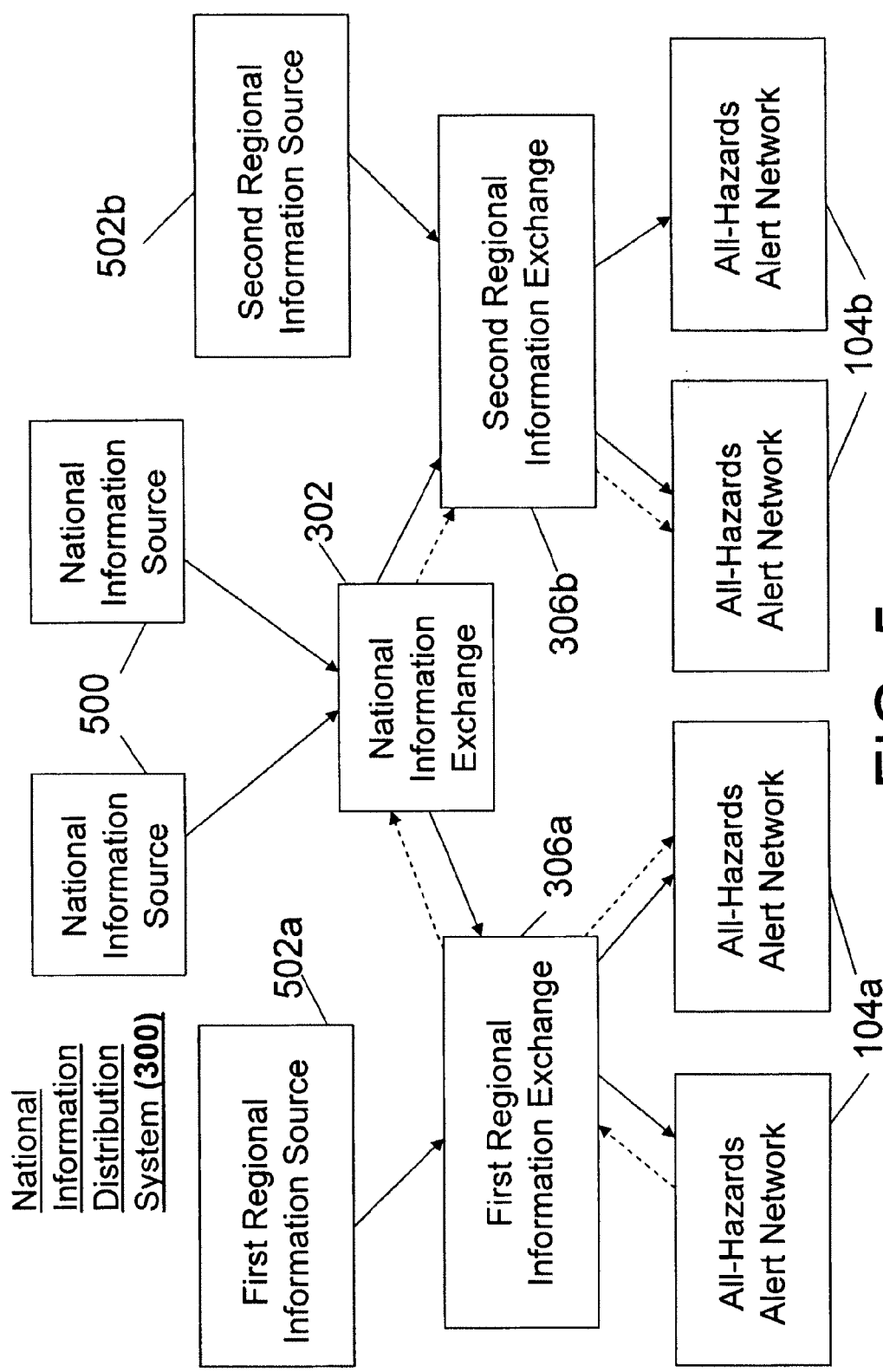
FIG. 5 illustrates a national information distribution system according to an embodiment of the present invention.

FIG. 5 illustrates a national information distribution system (300), including a national information exchange (302) connected to a plurality of national information sources (500) and to a plurality of regional information exchanges (306) corresponding to a plurality of regions. A first regional information exchange (306*a*) connects to one or more information sources corresponding to a first region and to a plurality of all-hazards alert networks corresponding to the first region. A second regional information exchange connects to one or more information sources corresponding to a second region and to a plurality of all-hazards alert networks corresponding (104*a*) to the second region.

Preferably, the national information exchange (302) gathers all-hazards information from the national information sources (500). The regional information exchanges (306) gathers all-hazards information from the regional information sources (502). The national information exchange (302) distributes all-hazards information to the regional information exchanges (306). The first regional information exchange (306*a*) distributes all-hazards information from the national information exchange (302) and from the first regional information sources (502*a*) to the first all-hazards alert networks (104*a*). Likewise, the second regional information exchange (306*b*) distributes all-hazards information from the national information exchange (302) and from the second regional information sources (502*b*) to the second all-hazards alert networks (104*b*). Also, the national information exchange (302) distributes directly to the plurality of all-hazards alert networks (104*a*) corresponding to the first region and the plurality of all-hazards alert networks corresponding to the second region (104b).

The regional information exchanges may, of course, correspond to a geographic region. In an alternate embodiment, the regional information exchanges may also correspond to domain-based regions. Domain-based regional information exchanges may generally relate to specialized subjects of interest to users of the domain-based regional information exchanges. The domain-based regional information exchanges may include information exchanges directed towards warning ordinary citizens, information exchanges directed towards warning first responders, information exchanges directed towards local, state, or federal agencies having specialized subjects of interest. Of course, geographic and domain-based regional information exchanges could be considered together in the information distribution system 100.

Additionally, one or more of the all-hazards alert networks may also be regional information sources. Accordingly, a first regional information exchange may gather all-hazards information from an all-hazards alert network that is also a regional information source and distribute to the one or more of the all-hazards alert networks corresponding to the first region or to one or more of the all-hazards alert networks corresponding to the second region. Also, the first regional information exchange may distribute directly to the all-hazards networks corresponding the second region.

The receiving and distributing of all-hazards information may occur in real-time, including that no action is required of a person between the receiving and distributing of the all-hazards information. The receiving and distributing of all-hazards information may be moderated, including that a decision of a person (moderator) occurs between the receiving and distributing of all-hazards information. Moderators may monitor incoming traffic, modify messages, forward messages and reject messages. Moderators may be alerted when new messages are received. The information exchanges may include both real-time and moderated gathering and distribution of all-hazards information.

All-hazards information generally relates to time sensitive information relating to personal or communal safety or convenience, and may include weather information, traffic information, seismic information, flood information, epidemic information, crime information, fire information, government announcements, school closings, tax notices, sporting events cancellations, terrorist information, biohazards information and natural disasters information. All-hazards information sources may include publicly available all-hazards information sources and non-publicly available all-hazards information sources. The non-publicly available all-hazards information sources may include internal government information sources and private information sources. The all-hazards information received from information sources may be text-based all-hazards information. The distributed all-hazards information may be distributed wirelessly. The distributed all-hazards information may be distributed via a packet-based network.

Additionally, the information exchange may receive and transmit non all-hazards information. Non-all-hazards information may include administrative information and subscription information.

National information sources may include information sources designed to provide all-hazards information affecting a nation. Regional information sources may include sources designed to provide all-hazards information specific to a region. Geographically regional information sources may include geographically regional traffic information, geographically regional news information, geographically regional weather information and geographically regional monitoring systems. National information sources may include the National Oceanographic and Atmospheric Administration and the World Health Organization.

Figure 6:
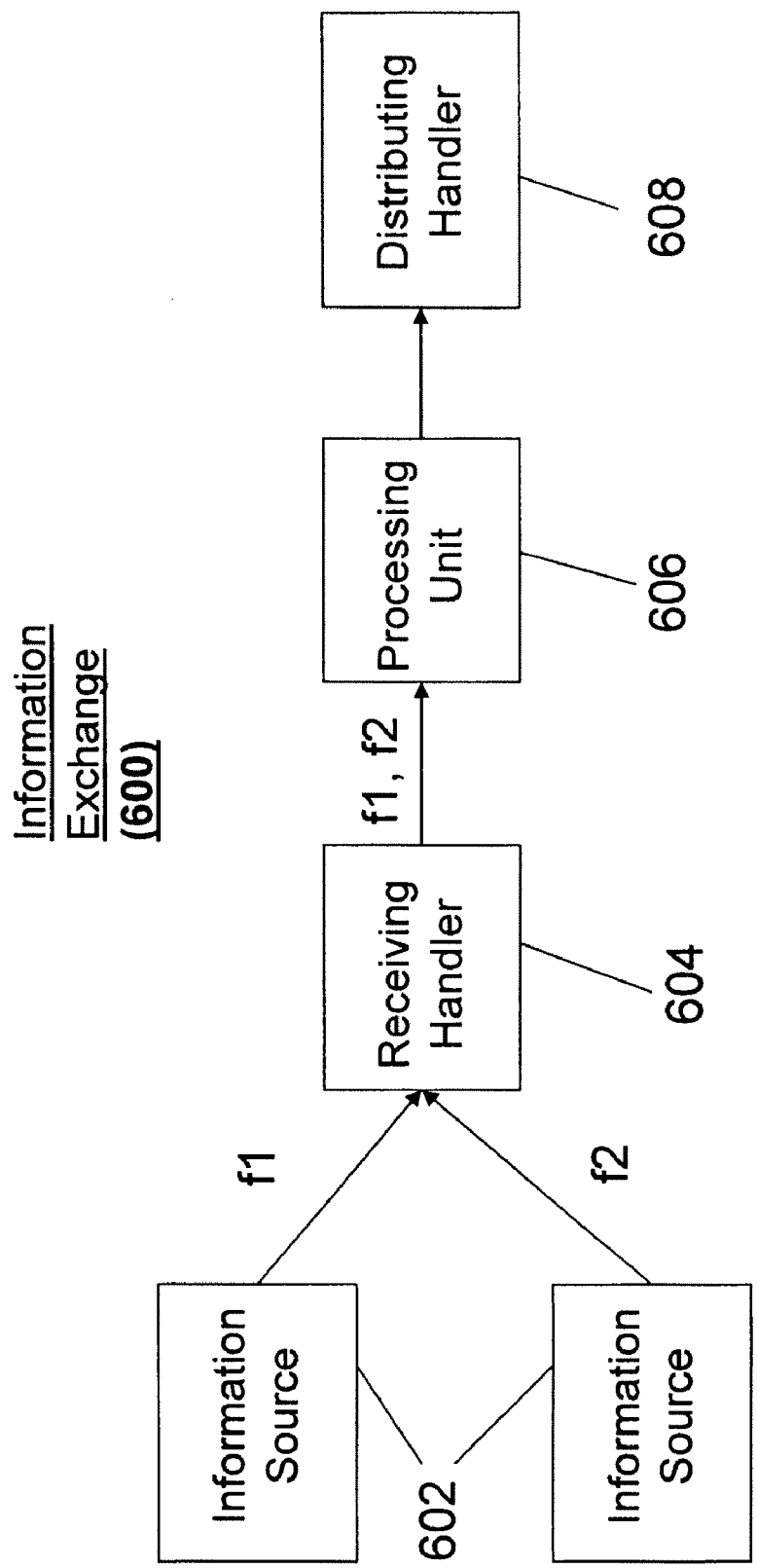
FIG. 6 illustrates an information exchange connected to information sources according to an embodiment of the present invention.

FIG. 6 illustrates an information exchange (600) connected to a plurality of information sources (602). The information exchange (600) includes one or more receiving handlers (604), one or more processing units (606) connected to the receiving handler (604), and one or more distributing handlers (608) connected to the processing units (606). The receiving handlers receive all-hazards information from the information sources (602), the processing units (606) process the received all-hazards information, and the distributing handlers (608) distribute the processed all-hazards information. The receiving handlers (604) may receive the all-hazards information in a plurality of different formats (f1, f2) from the plurality of information sources (602).

Figure 7:
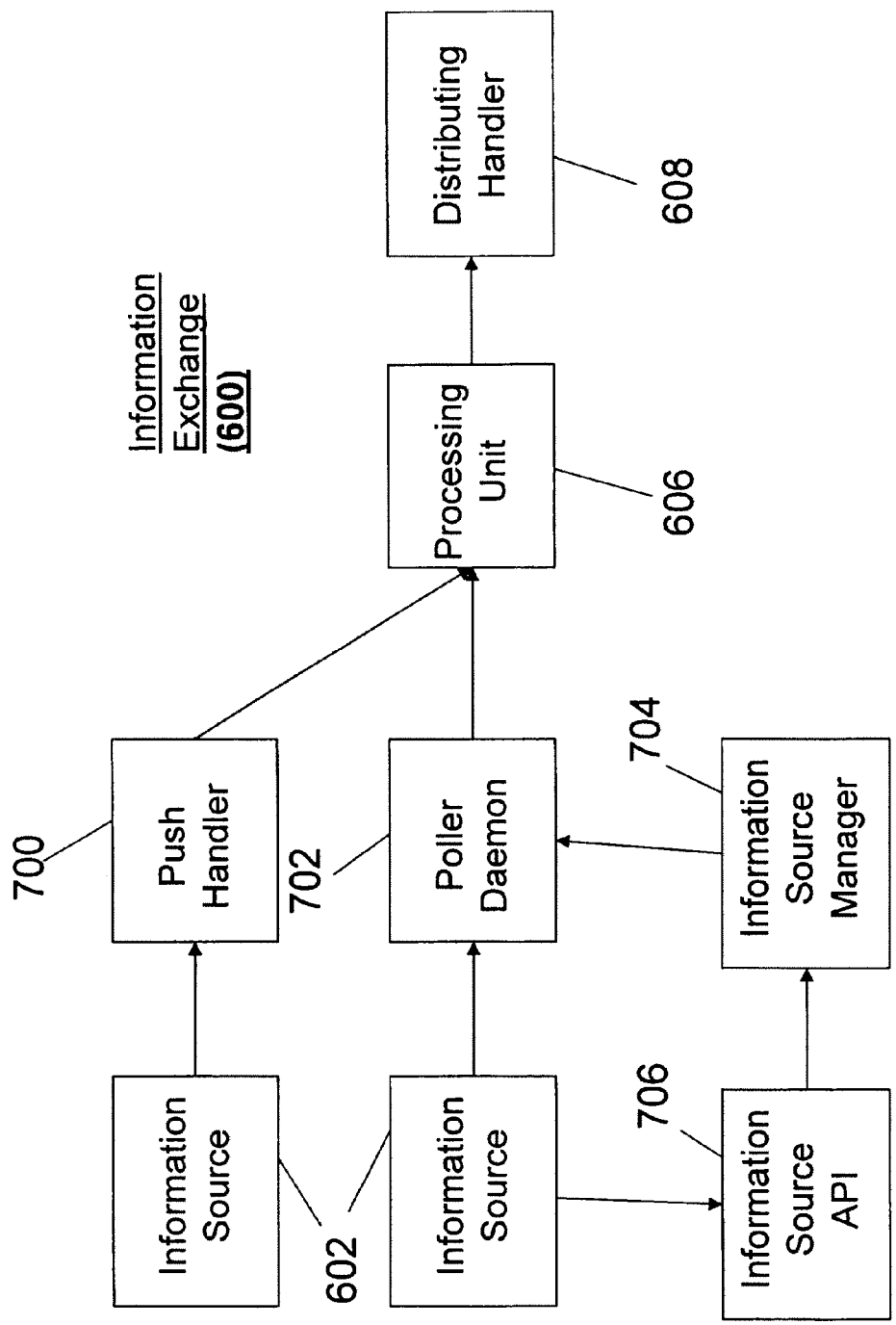
FIG. 7 illustrates an information exchange including a push handler, a poller daemon, an information source manager and an information source API according to an embodiment of the present invention.

FIG. 7 illustrates an information exchange (600) connected to a plurality of information sources (602). The information exchange (600) includes one or more push handlers (700), one or more poller daemons (702), one or more processing units (606) connected to the push handlers (700) and to the poller daemons (702), and one or more distributing handlers (608) connected to the processing units (606). The push handlers (700) receive pushed all-hazards information from one or more information sources (602) and the poller daemons (702) retrieve polled all-hazards information from one or more information sources (602). The processing units (606) process the all-hazards information from the push handlers (700) and the poller daemons (702). The distributing handlers (608) distribute the processed all-hazards information.

The push handlers (700) may receive all-hazards information in a plurality of different formats from a plurality of information sources, and the poller daemon (702) may receive all-hazards information in a plurality of different formats from a plurality of information sources (602). The poller daemons (702) may poll the one or more information sources at a predefined frequency. Polling methods include polling via HTTP GET and via HTTP POST. Furthermore, other types of receiving handlers may be added as plug-in modules to the information exchange, and any data source may be accessed.

FIG. 7 further illustrates that the information exchange may include one or more information source managers (704) connected to the poller daemons (702) and one or more information source application programming interfaces (API) (706) connected to the information source managers (704). The poller daemons (702) retrieve polled all-hazards information from one or more information sources (602). The processing units (606) process the all-hazards information from the poller daemons (702). The distributing handlers (608) distribute the processed all-hazards information. The information source managers (704) maintain polling parameters specific to each information source. The information source API (706) accepts polling parameters from information source providers and communicate the polling parameters to the information source managers (704). The polling parameters may include delivery method, polling frequency and information format. The information source managers (704) communicate the polling parameters to the poller daemons (702).

Figure 8:
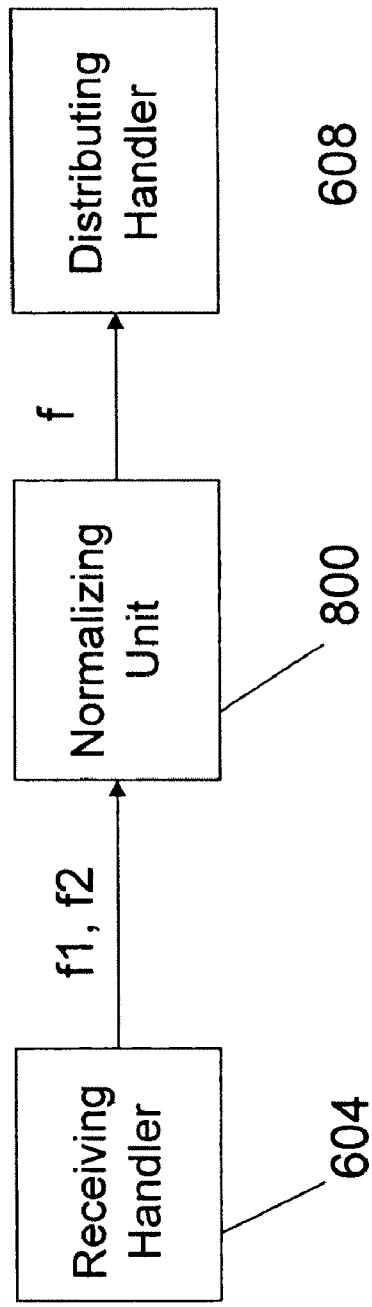
FIG. 8 illustrates an information exchange including a normalizing unit according to an embodiment of the present invention.

FIG. 8 illustrates an information exchange (600), including one or more receiving handlers (604), one or more normalizing units (800) connected to the receiving handlers (604), and one or more distributing handlers (608) connected to the normalizing units (800). The receiving handlers (604) receive all-hazards information in a plurality of different formats (f1, f2), the normalizing units (800) normalize the plurality of different formats (f), and the distributing handlers (608) distribute the normalized all-hazards information. Normalizing may include reducing the differences in the plurality of formats. Normalizing may include reducing the number of different formats. Normalizing may include normalizing the different formats to a standard format.

Figure 9:
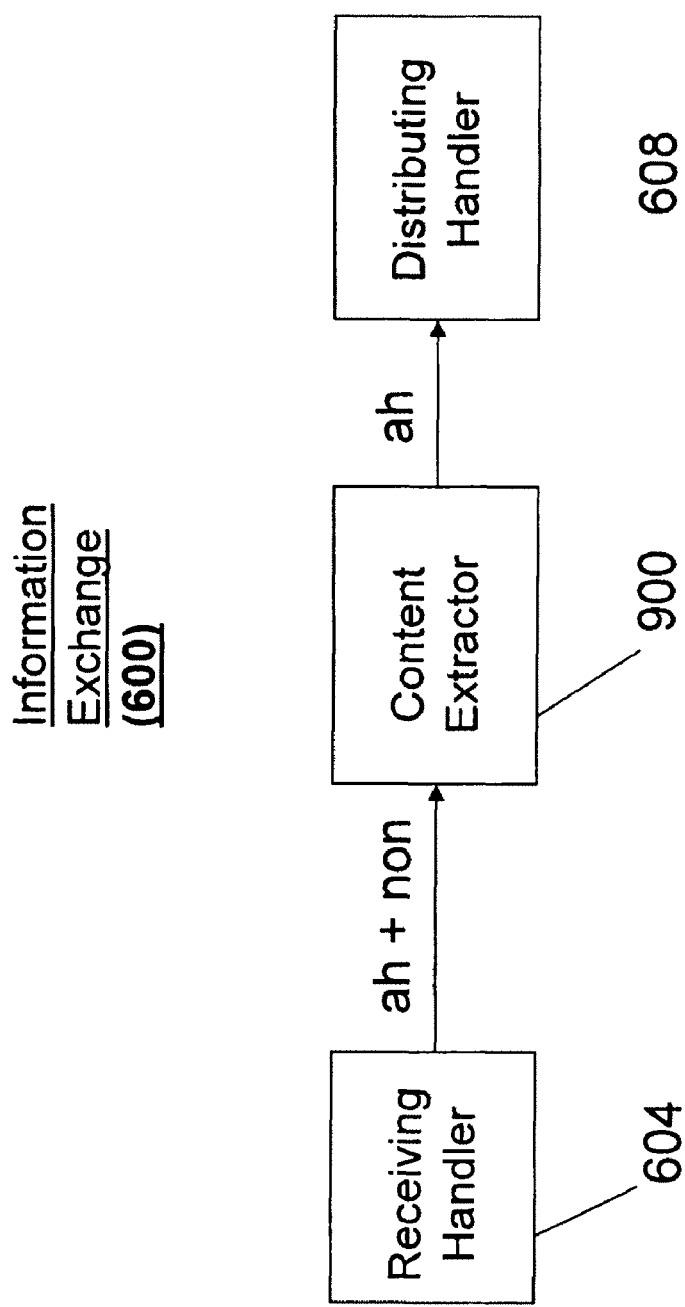
FIG. 9 illustrates an information exchange including a content extractor according to an embodiment of the present invention.

FIG. 9 illustrates an information exchange (600), including one or more receiving handlers (604), one or more content extractors (900) connected to the receiving handlers (604), and one or more distributing handlers (608) and connected to the content extractors (900). The receiving handlers (604) receive all-hazards information that includes all-hazards content (ah) and non-all-hazards content (non). The content extractors (900) extract a payload of all-hazards content (ah) from the all-hazards information. The distributing handlers (604) distribute the payload of all-hazards content. Extracting may include separating the all-hazards content (ah) from non-all-hazards content (non) and disposing of the non-all-hazards content (non). Optionally, the content extractors (900) may assign a feed to the payload of all-hazards content.

Figure 10:
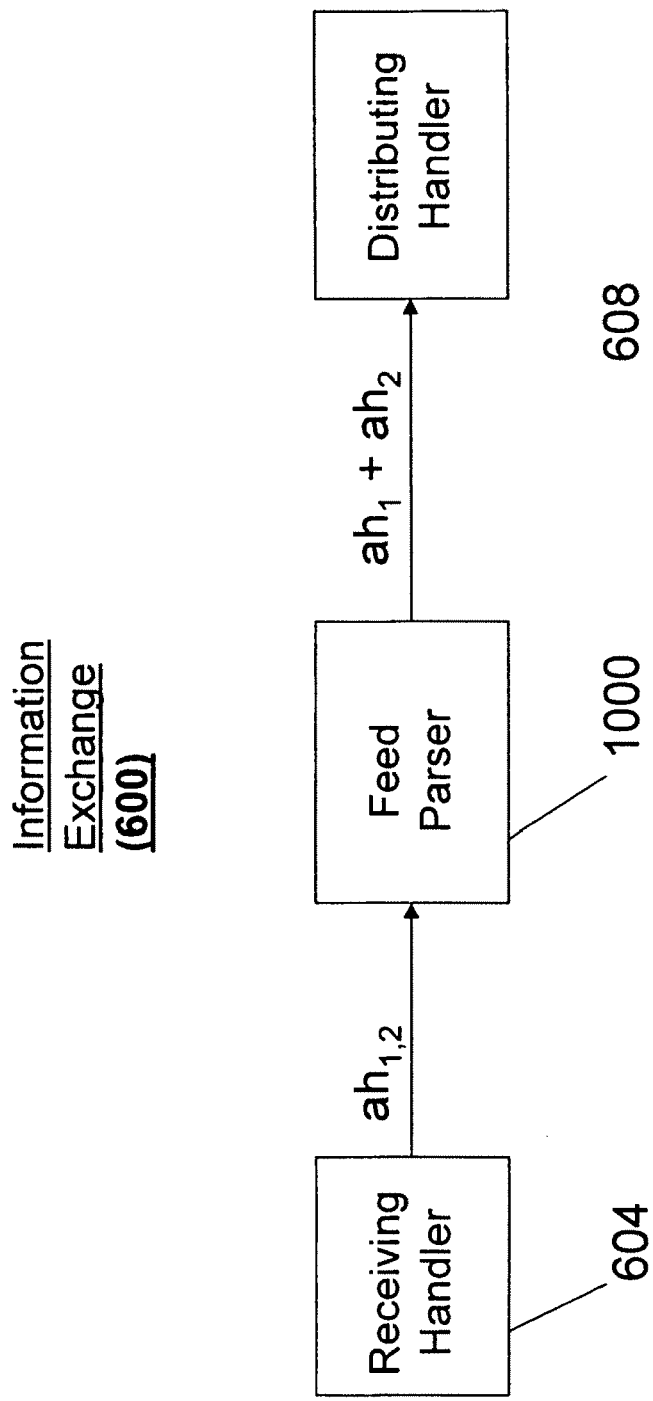
FIG. 10 illustrates an information exchange including a feed parser according to an embodiment of the present invention.

FIG. 10 illustrates an information exchange (600), including one or more receiving handlers (604), one or more feed parsers (1000) connected to the receiving handlers (604), and one or more distributing handlers (608) connected to the feed parsers (1000). The receiving handlers (604) may receive all-hazards information ($ah_{1,2}$) that includes a plurality of distinct pieces of all-hazards information ($ah_1+ah_2$). The feed parsers (1000) parse the received all-hazards information into pieces of all-hazards information ($ah_1+ah_2$). The distributing handlers (608) distribute one or more of the pieces of parsed all-hazards information. Parsing may include identifying all-hazards information pieces ($ah_1+ah_2$) in the received all-hazards information ($ah_{1,2}$) and separating the received all-hazards information ($ah_{1,2}$) into pieces of all-hazards information ($ah_1+ah_2$).

Feed parsers include Really Simple Syndication (RSS), Common Alerting Protocol (CAP), plain text messages, NIEM, general purpose, custom XML, and other formats as may be preferred from the circumstances.

Figure 11:
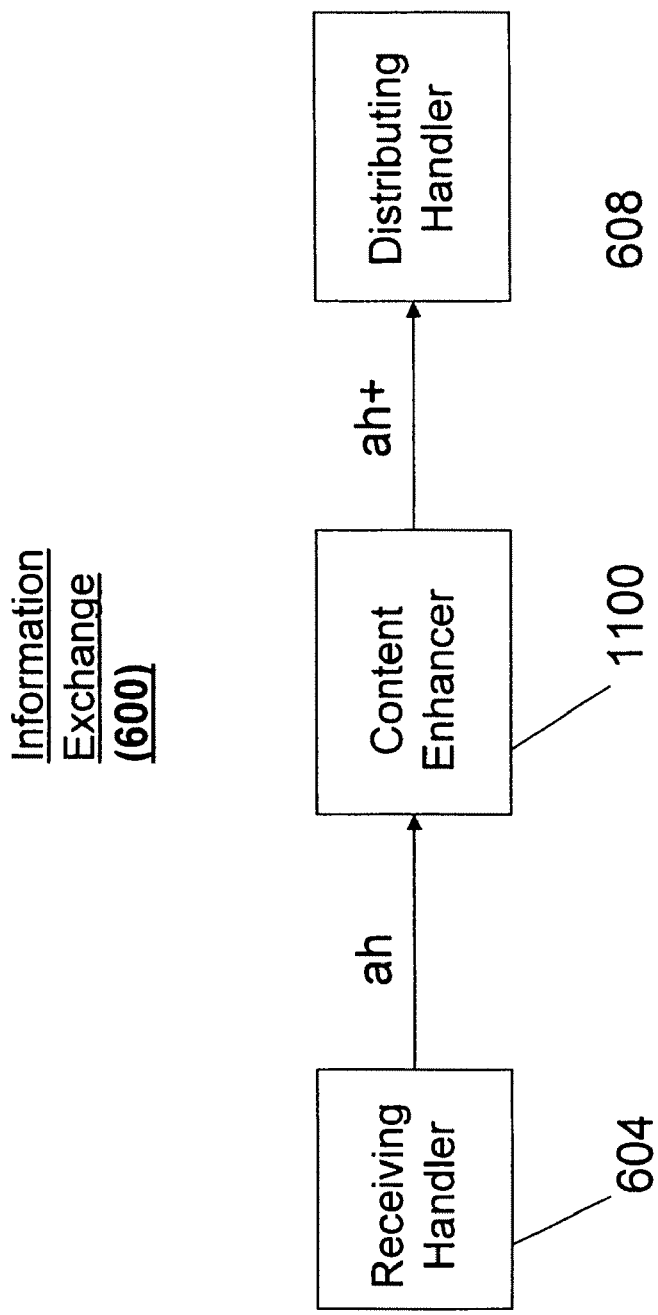
FIG. 11 illustrates an information exchange including a content enhancer according to an embodiment of the present invention.

FIG. 11 illustrates an information exchange (600), including one or more receiving handlers (604), one or more content enhancers (1100) connected to the receiving handlers (604), and one or more distributing handlers (608) connected to the content enhancers (1100). The receiving handlers (604) receive all-hazards information (ah), content enhancers (1100) may enhance (ah+) the content of the received all-hazards information, and the distributing handlers (608) distribute the enhanced all-hazards information (ah+). The content enhancers may expand abbreviations of the received all-hazards information, may translate the received all-hazards information, and may attach timestamps to the received all-hazards information. The content enhancers may add audio and visual information to a received text-based all-hazards information. The content enhancers may geolocate affected areas of the received all-hazards information and add visual displays of the affected areas to the distributed all-hazards information. The content enhancers may identify the locations of nearby facilities. The content enhancers may find alternative routes around heavy traffic areas.

Figure 12:
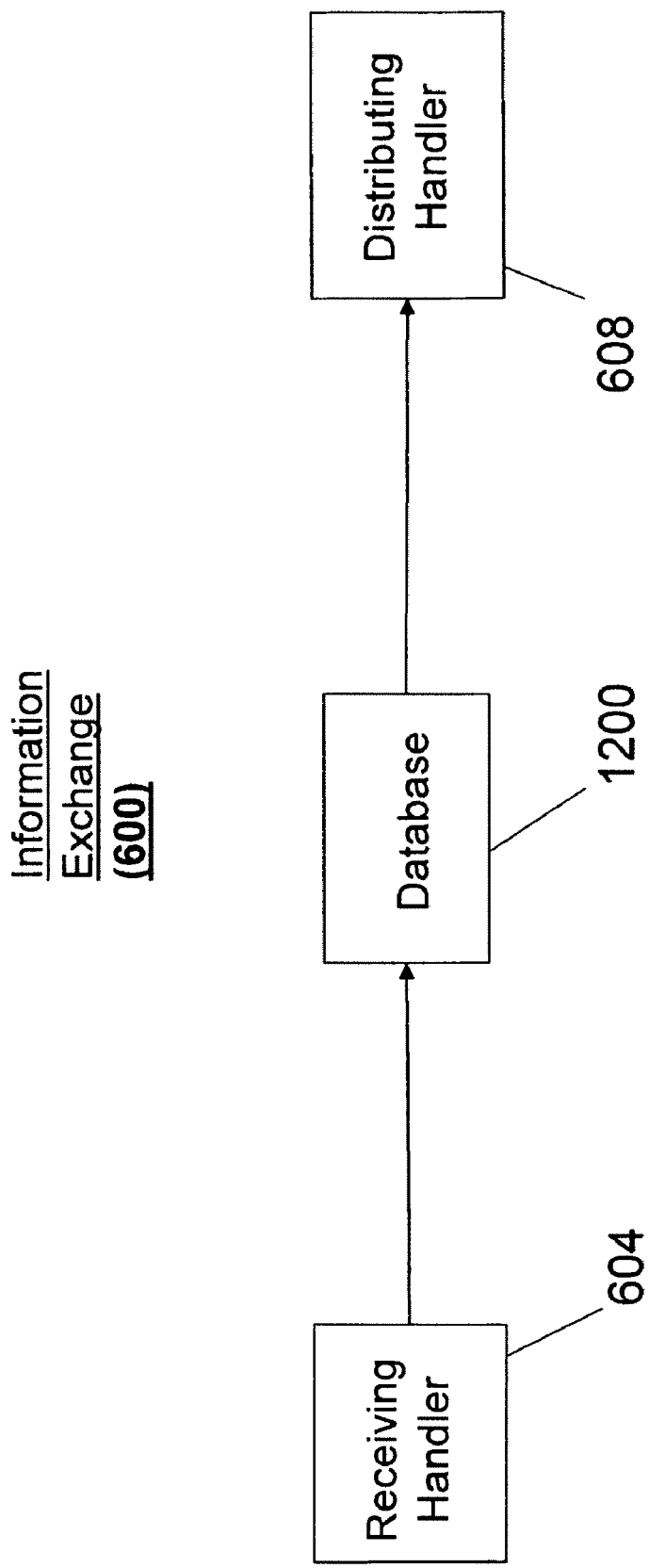
FIG. 12 illustrates an information exchange including a database according to an embodiment of the present invention.

FIG. 12 illustrates an information exchange (600). The information exchange (600) may include: one or more receiving handlers (604); at least one of a normalizing unit, a content extractor, a feed parser and a content enhancer (not shown) connected to the receiving handlers (604); one or more databases (1200) connected to the at least one normalizing unit, content extractor, feed parser and content enhancer; and one or more distributing handlers (608) connected to the databases (1200). The receiving handlers (604) receive all-hazards information. The normalizing unit normalizes the received all-hazards information. The content extractor filters the received all-hazards information. The feed parser parses the received all-hazards information. The content enhancer enhances the content of the received all-hazards information. The database (1200) enters into storage the all-hazards information processed by the at least one normalizing unit, content extractor, feed parser and content enhancer. The distributing handlers (608) distribute the stored all-hazards information.

Figure 13:
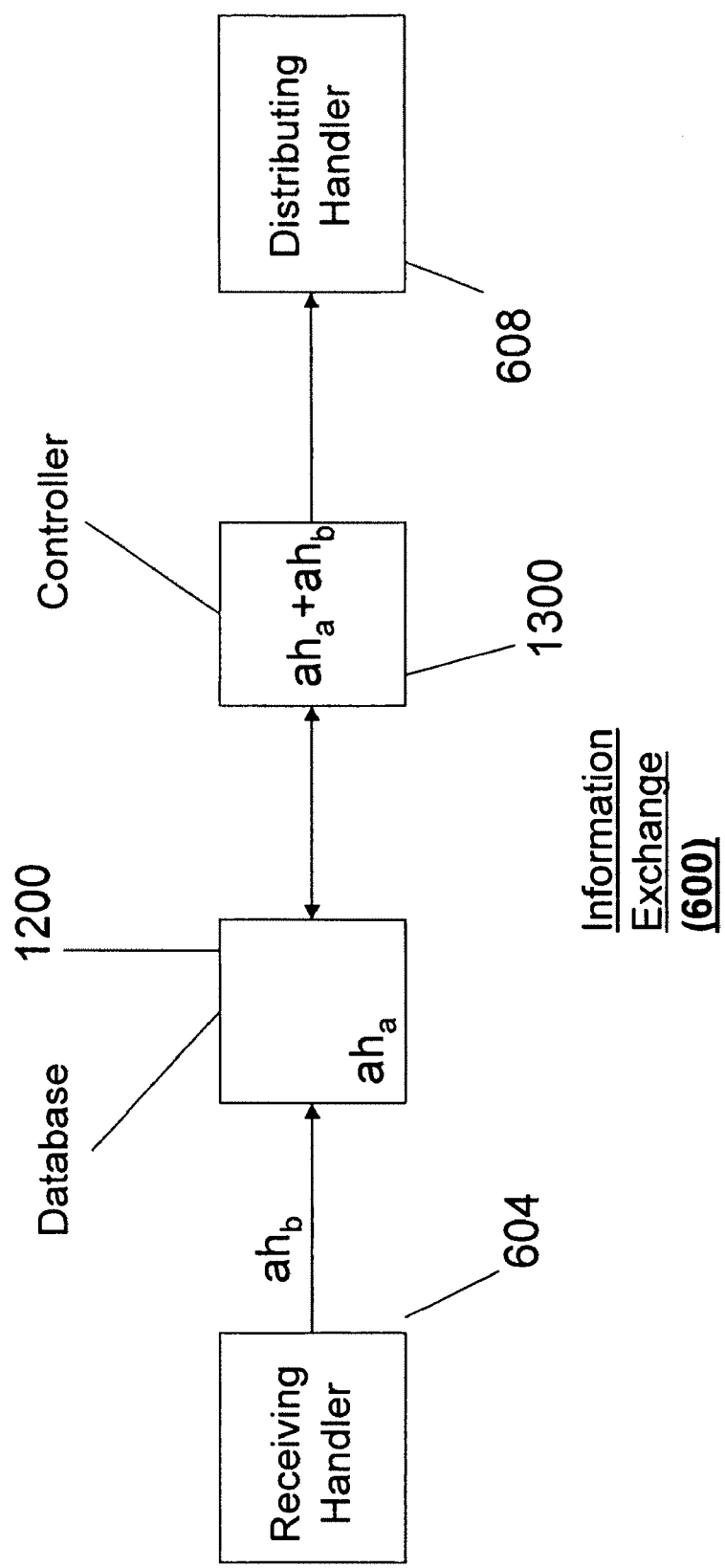
FIG. 13 illustrates an information exchange including a controller according to an embodiment of the present invention.

FIG. 13 illustrates an information exchange (600), including one or more receiving handlers (604), one or more databases (1200) connected to the receiving handlers (604), one or more controllers (1300) connected to the databases (1200), and one or more distributing handlers (608) connected to the controllers (1300). The receiving handlers (604) receive all-hazards information, the databases (1200) enter the received all-hazards information into storage, the controllers (1300) analyze the stored all-hazards information and initiate all-hazards messages from the stored all-hazards information, and the distributing handlers (608) distribute the initiated all-hazards messages. The controllers (1300) may analyze across multiple entries of the stored all-hazards information ($ah_a$, $ah_b$) and initiate all-hazards messages from the multiple entries of all-hazards information.

The controllers may employ data mining and trend analysis in the analysis across multiple entries of the stored all-hazards information, such as determining the size of a fire based on the number of smoke detectors reporting the fire or the number of 911 calls received or such as detecting preparation for a coordinated terrorist attack based on multiple reports on suspicious activities on bridges.

Figure 14:
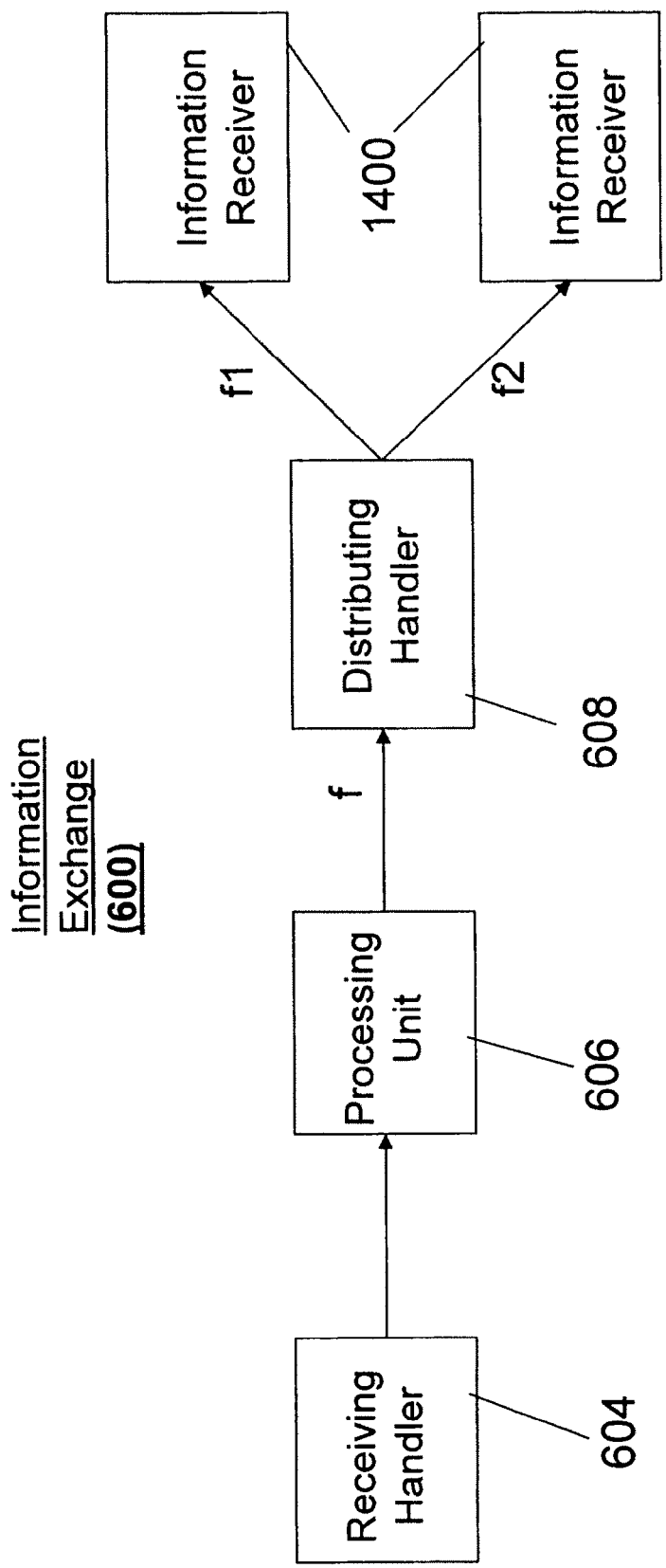
FIG. 14 illustrates an information exchange connected to information receivers according to an embodiment of the present invention.

FIG. 14 illustrates an information exchange (600), including one or more receiving handlers (604), one or more processing units (606) connected to the receiving handlers, and one or more distributing handlers (608) connected to the processing units. The receiving handlers (604) receive all-hazards information, the processing units (606) process the received all-hazards information, and the distributing handlers (608) distribute the processed all-hazards information in a plurality of different formats (f1, f2) to a plurality of information receivers (1400). The formatted all-hazards information may have a plurality of different formats with substantially the same all-hazards content. The plurality of different formats may correspond to different format requirements of the plurality of information receivers (1400). The distributing handlers (608) push the all-hazards information in a protocol and format selected by the information receivers (1400).

Figure 15:
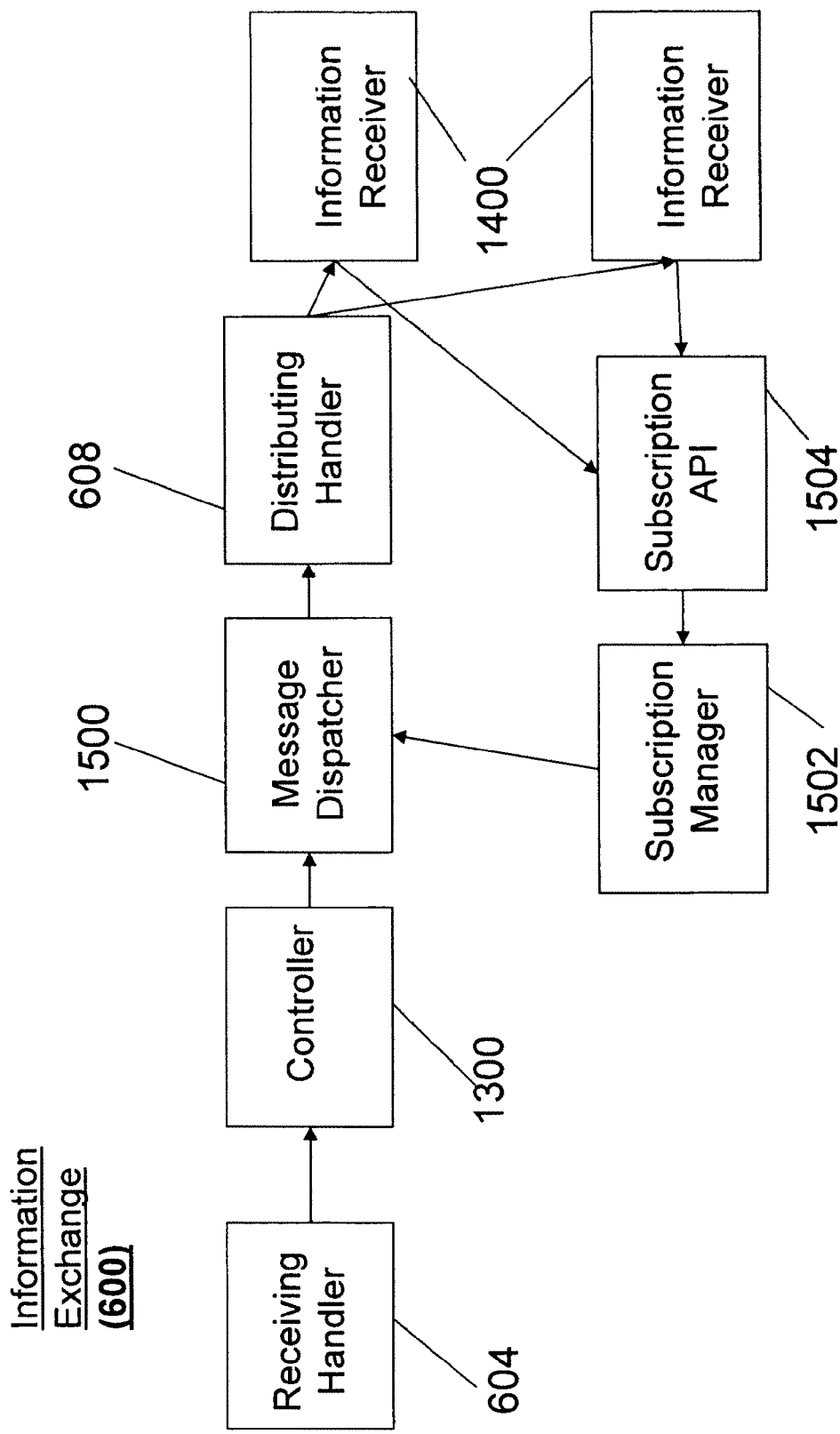
FIG. 15 illustrates an information exchange including a message dispatcher, a subscription handler and a subscription API according to an embodiment of the present invention.

FIG. 15 illustrates an information exchange (600), including one or more receiving handlers (604), one or more controllers (1300) connected to the receiving handlers (604), one or more message dispatchers (1500) connected to the controllers (1300), and one or more distributing handlers (608) connected to the message dispatchers (1500). The receiving handlers receive all-hazards information. The controllers (1300) analyze the received all-hazards information and initiate an all-hazards message from the analyzed all-hazards information. The message dispatchers (1500) identify information receivers (1400) subscribed to receive the initiated all-hazards message. The message dispatchers (1500) identify information receivers (1400) in an affected area of the initiated all-hazards message. The distributing handlers (608) distribute the initiated all-hazards message to the identified information receivers.

Furthermore, the information exchange of FIG. 15 may include one or more subscription managers (1502) connected to the message dispatchers and one or more subscription management API (1504) connected to the one or more subscription managers. The subscription managers (1502) maintain subscription parameters for information receivers and communicate the subscription parameters to the message dispatchers (1500). The subscription parameters may include a content requirement of a subscriber or group of subscribers in order for an all-hazards message to be distributed to them. The subscription management API (1504) accepts subscription parameters from information receivers (1400) and communicates the subscription parameters to the subscription managers (1502). The receiving handlers (603) receive all-hazards information. The controllers (1300) analyze the received all-hazards information and initiate an all-hazards message from the analyzed all-hazards information. The message dispatchers (1502) identify information receivers (1400) subscribed to receive the initiated all-hazards message according to the subscription parameters. The distributing handlers (608) distribute the initiated all-hazards message to the identified information receivers.

The subscription API (1504) may include a web-interface or web service for adding or modifying subscriptions.

Figure 16:
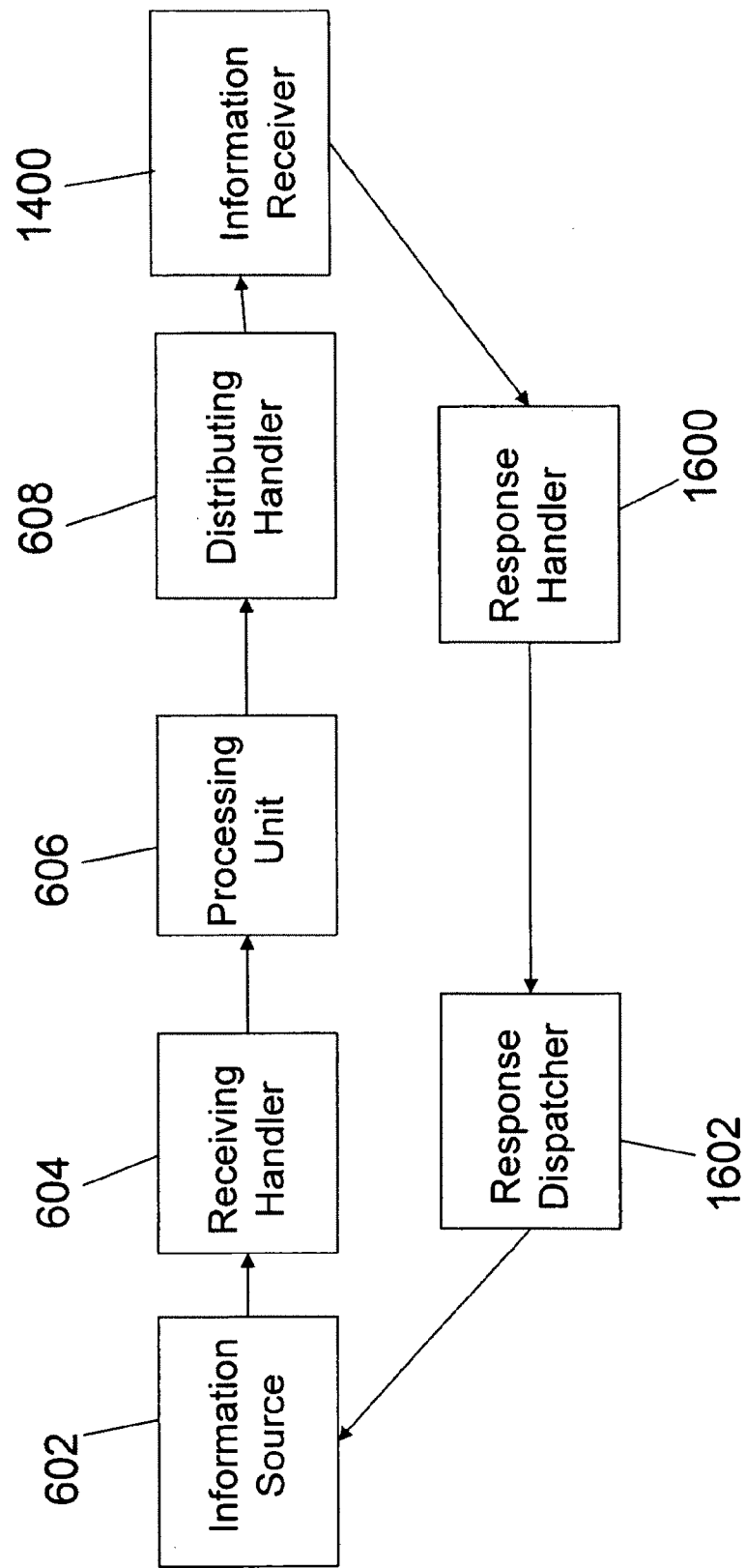
FIG. 16 illustrates an information exchange including a response handler and a response dispatcher according to an embodiment of the present invention.

FIG. 16 illustrates an information exchange (600), including one or more receiving handlers (604), one or more processing units (606) connected to the receiving handlers, and one or more distributing handlers (608) connected to the processing units. Furthermore, the information exchange (600) include one or more response handlers (1600) and one or more response dispatchers (1602) connected to the one or more response handlers. The receiving handlers receive all-hazards information from one or more information sources, the processing units process the received all-hazards information, and the distributing handlers distribute the processed all-hazards information to one or more information receivers. The response handlers receive a response to the distributed all-hazards information and the response dispatcher delivers the response to a provider of the information source.

Furthermore, the response handlers may identify an all-hazards message corresponding to the response. The response handlers identify the information source or provider of the information source corresponding to the all-hazards message. The response handlers route the response to the information source or provider of the information source corresponding to the all-hazards message. Also, the response handlers may identify the source of the response and the location of the responder and report the source and location to the information source or provider of the information source corresponding to the all-hazards message. The response may confirm the original message and provide additional relevant information to the information source or provider of the information source corresponding to the all-hazards message. Additionally, the response may be added to the database for further analysis and may result in initiated all-hazards messages.

Figure 17:
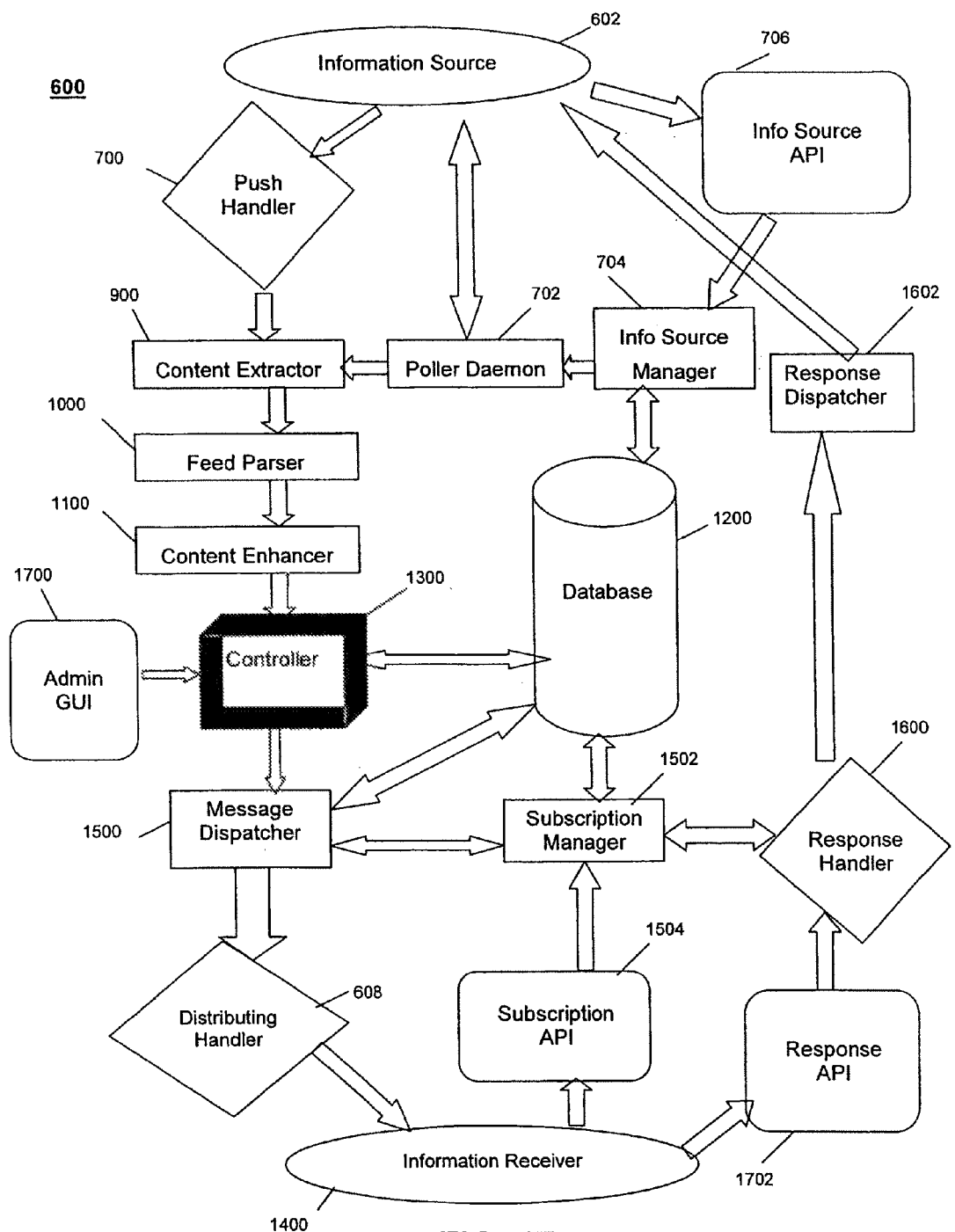
FIG. 17 illustrates an information exchange according to an embodiment of the present invention.

FIG. 17 illustrates an information exchange (600). The information exchange includes one or more push handlers (700) and one or more poller daemons (702). The push handlers (700) receive pushed all-hazards information from one or more information sources (602) and the poller daemons (702) retrieve polled all-hazards information from one or more information sources (602).

The information exchange (600) includes one or more information source managers (704) connected to the poller daemons and one or more information source application programming interfaces (API) (706) connected to the information source managers. The information source managers maintain polling parameters specific to each information source, and the information source API may accept polling parameters from providers of the information sources and communicate the polling parameters to the information source managers. The information source managers may communicate the polling parameters to the poller daemons and store the polling parameters in a database.

Also, the information source managers may report status of information received from information sources. For example, the information source managers report to the information sources or providers of the information sources whether and when information received from the information sources were distributed. The information source managers report who received the distributed information to the information sources or providers of the information sources. The information source managers may access the status by communicating with a database (1200) storing the status.

Additionally, the information source managers may maintain privacy preferences of the information sources. For example, the information source managers maintain whether a particular information source is publishable, authorized-only or approved-only. The privacy preferences may be stored in a database (1200).

The information exchange includes one or more content extractors (900) connected to the push handlers and to the poller daemons. The content extractors receive all-hazards information from the push handlers and the poller daemons and extract a payload of all-hazards content from the all-hazards information.

The information exchange includes one or more feed parsers (1000) connected to the content extractors. The feed parsers parse the payload of all-hazards content into pieces of all-hazards content.

The information exchange includes one or more content enhancers (1100) connected to the feed parsers. The content enhancers enhance the content of the pieces of all-hazards information.

Furthermore, the information exchange includes processing units for normalizing the all-hazards information. The normalizing function may be a separate processing unit or may be a function of another element of the information exchange. For example, the feed parsers may normalize the all-hazards information.

Furthermore, the information exchange may eliminate duplication of all-hazards information. The information exchange may identify and eliminate substantially exact duplicates of all-hazards information. The information exchange may identify closely-related all-hazards information and eliminate closely-related all-hazards information, or the information exchange may identify closely related all-hazards information and combine the closely-related all-hazards information.

The information exchange includes one or more controllers (1300) connected to the content enhancers and one or more databases (1200) connected to the controllers. The controllers analyze the pieces of all-hazards information and initiate all-hazards messages from the analyzed all-hazards information. The databases enter the pieces of all-hazards information into storage. Furthermore, the controllers may analyze across multiple entries of the stored all-hazards information and initiate all-hazards messages from the multiple entries of all-hazards information.

The information exchange includes one or more message dispatchers (1500) connected to the controllers, and one or more distributing handlers (608) connected to the message dispatchers. The message dispatchers identify information receivers subscribed to receive the initiated all-hazards messages. The message dispatchers receive filtering parameters of information receivers. For example, the filtering parameters may include that the information receiver only receives messages at desired times or only with desired keywords. The distributing handlers distribute the initiated all-hazards messages to the identified information receivers.

The information exchange includes one or more subscription managers (1502) connected to the message dispatchers and one or more subscription management API (1504) connected to the one or more subscription managers. The subscription managers maintain subscription parameters for information receivers and communicate the subscription parameters to the message dispatchers. The subscription management API accepts subscription parameters from information receivers and communicates the subscription parameters to the subscription managers. The subscription parameters may include whether particular information receivers are subscribed to receive a particular all-hazards message. Also, the subscription parameters may include filtering parameters. The subscription managers may store the subscription parameters in databases (1200).

Also, the information exchange may identify status of information received from information sources. For example, the controllers or message dispatchers may identify whether and when information received from particular information sources was distributed. The subscription managers may identify who received the information from the particular information sources. The status of the information received from information sources may be stored in a database, which may then be accessed by information source managers.

Additionally, the subscription managers may identify privacy preferences of the information sources. The privacy preferences may be accessed from a database. For example, the subscription managers may identify whether particular information sources are publishable, authorized-only or approved-only. Further, the subscription managers may identify whether the particular subscribers are approved for the particular information sources.

The information exchange includes one or more response handlers (1600) and one or more response dispatchers (1602) connected to the one or more response handlers. The response handlers receive responses to the distributed all-hazards messages, identify the all-hazards message that corresponds to the response, and identify the information source or provider that corresponds to the all-hazards message. The response handler may communicate with the subscription manager to identify the information source or provider that corresponds to the all-hazards message, and the response dispatcher may deliver the responses to the corresponding information source provider.

The information exchange may include an admin GUI. The admin GUI may be a web-based interface for changing setup parameters of the controller, for approving information sources and for modifying filters. Another method for changing setup parameters of the controller, for approving information sources and for modifying filters is through a GUI of the information receiver that then communicates with the subscription API of the information exchange.

The information exchange may include a response API for communicating responses from outside the information exchange to the information sources or information source providers.

Figure 18:
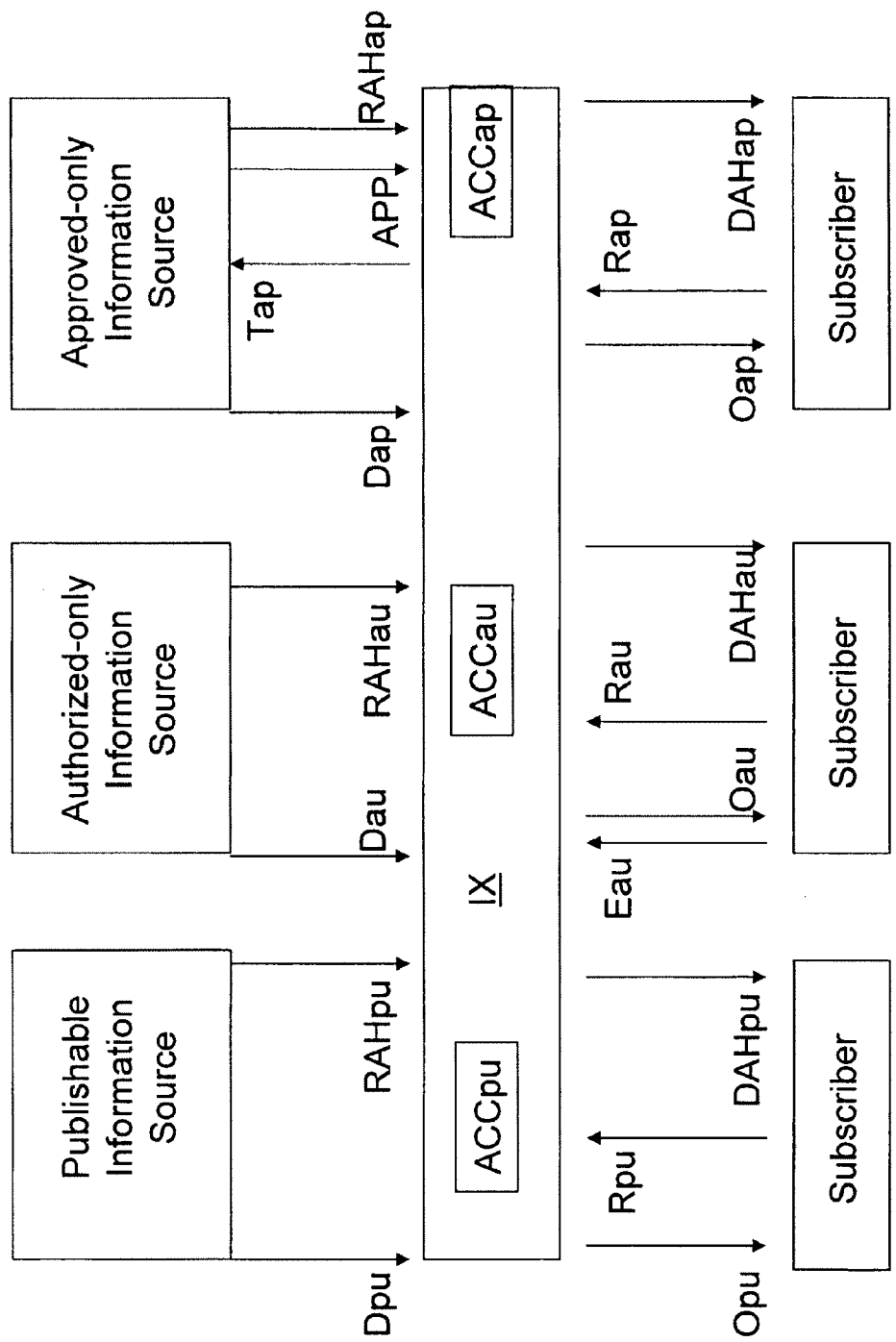
FIG. 18 illustrates a method of maintaining privacy of distributed information according to an embodiment of the present invention.

FIG. 18 illustrates a method of maintaining privacy of distributed information. The method may include receiving a determination that an information source is publishable (Dpu), receiving a determination that another information source is authorized-only (Dau), and receiving a determination that yet another information source is approved-only (Dap). The determination may be received from the providers of the information sources. The authorized-only and approved-only information sources may be non-publishable.

The method of FIG. 18 may include offering a subscription to the publishable information source (Opu) to a potential subscriber, receiving a request for subscription to the publishable information source (Rpu) from a potential subscriber, and accepting the request for subscription to the publishable information source (ACCpu).

The method of FIG. 18 may include receiving authorization evidence from a potential subscriber to the authorized-only information source (Eau), offering the authorized potential subscriber a subscription to the authorized-only information source (Oau), receiving a request for subscription to the authorized-only information source (Rau) from the potential subscriber, and accepting the request for subscription of the authorized potential subscriber to the authorized-only information source (ACCau). The authorization evidence may include an authorization code. The authorization code may be an alphanumeric authorization code.

The method of FIG. 18 may include offering a potential subscriber a subscription to the approved-only information source (Oap), receiving a request for subscription to the approved-only information source (Rap) from a potential subscriber, transmitting to a provider of the approved-only information source the request for subscription to the approved-only information source (Tap), receiving an approval of the request of the potential subscriber to the approved-only information source (APP) from a provider of the approved-only information source, and accepting the approved request for subscription to the approved-only information source (ACCap). The request for subscription to the approved-only information source may include identification information of the potential subscriber. The request for subscription to the approved-only information source may be an application sent through an information exchange (IX) to the provider of the information source.

Additionally, the method of maintaining privacy of distributed information may include an embodiment wherein the authorized-only information also requires approval. The embodiment (not illustrated) may include receiving a request for subscription to the authorized-only information source from a potential subscriber, transmitting to a provider of the authorized-only information source the request for subscription to the authorized-only information source, receiving an approval of the request of the potential subscriber to the authorized-only information source from a provider of the authorized-only information source, and accepting the approved request for subscription to the authorized-only information source. The request for subscription to the authorized-only information source may include identification information of the potential subscriber.

The method of maintaining privacy of distributed information may include a feed selector tree. The publishable and approved-only information sources may appear as feeds in the feed selector trees. The authorized-only information source may not be visible in the feed selector tree prior to receipt of authorization evidence. The authorized-only information source may appear as a feed in the feed selector tree after authorization is complete.

The method FIG. 18 may include receiving all-hazards information into an information exchange from the publishable information source (RAHpu), receiving all-hazards information into the information exchange from the authorized-only information source (RAHau), and receiving all-hazards information into the information exchange from the approved-only information source (RAHap).

The method FIG. 18 may include distributing the publishable all-hazards information to the accepted subscriber to the publishable information source (DAHpu), distributing the authorized-only all-hazards information to the accepted subscriber to the authorized-only information source (DAHau), and distributing the approved-only all-hazards information to the accepted subscriber to the approved-only information source (DAHap).

The method of maintaining privacy of distributed information may include a feed selector tree.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of maintaining privacy of distributed information, comprising:
   receiving a determination that a first information source is publishable;
   receiving a determination that a second information source is authorized-only;
   receiving a determination that a third information source is approved-only;
   offering a first subscriber a subscription to the first information source;
   receiving a request for subscription to the first information source from the first subscriber;
   accepting the request for subscription to the first information source from the first subscriber;
   receiving authorization evidence from a second subscriber to the second information source;
   offering the authorized second subscriber a subscription to the second information source;
   receiving a request for subscription to the second information source from the second subscriber;
   accepting the request for subscription to the second information source from the second subscriber;
   offering a third subscriber a subscription to the third information source;
   receiving a request for subscription to the third information source from the offered third subscriber;
   transmitting to a provider of the third information source the request for subscription to the third information source;
   receiving an approval of the request for subscription to the third information source from the provider;
   accepting the approved request for subscription to the third information source;
   receiving a first all-hazards information into an information exchange from the first information source;
   receiving a second all-hazards information into the information exchange from the second information source;
   receiving a third all-hazards information into the information exchange from the third information source;
   distributing the first all-hazards information to the first subscriber;
   distributing the second all-hazards information to the second subscriber; and
   distributing the third all-hazards information to the third subscriber.

2. The method of claim 1, wherein the determinations are received from the providers of the information sources.

3. The method of claim 1, wherein the authorization evidence includes an authorization code.

4. The method of claim 3, wherein the authorization code is an alphanumeric authorization code.

5. The method of claim 1, wherein the request for subscription to the third information source includes identification information of the third subscriber.

6. The method of claim 1, further comprising:
   transmitting to a provider of the second information source the request for subscription to the second information source; and
   receiving an approval of the request from the provider of the second information source,
   wherein the accepted request for subscription to the second information source is an approved request.

7. The method of claim 1, wherein the request for subscription to the third information source comprises an application.

* * * * *